(12) United States Patent
Huang et al.

(10) Patent No.: US 10,614,805 B2
(45) Date of Patent: Apr. 7, 2020

(54) VOICE-ASSISTED RESTOCKING METHOD AND SYSTEM

(71) Applicant: MIDEA GROUP CO., LTD., Foshan (CN)

(72) Inventors: Yingbiao Huang, San Jose, CA (US); Tian Tang, Sunnyvale, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/917,304

(22) Filed: Mar. 9, 2018

(65) Prior Publication Data

US 2019/0279625 A1   Sep. 12, 2019

(51) Int. Cl.
*G10L 15/22*   (2006.01)
*G10L 15/30*   (2013.01)
(Continued)

(52) U.S. Cl.
CPC ............... *G10L 15/22* (2013.01); *G06F 3/02* (2013.01); *G06F 3/0484* (2013.01); *G06F 3/167* (2013.01); *G06K 9/00087* (2013.01); *G06Q 50/28* (2013.01); *G10L 15/30* (2013.01); *G06F 3/0488* (2013.01); *G10L 2015/223* (2013.01)

(58) Field of Classification Search
USPC .................................................... 704/1–504
See application file for complete search history.

(56) References Cited

U.S. PATENT DOCUMENTS 8,823,523 B2 * 9/2014 Lee .......................... F25D 29/00
                                                   340/4.37
9,024,716 B2 * 5/2015 Yum ....................... F25D 29/00
                                                   340/3.1
(Continued)

FOREIGN PATENT DOCUMENTS

CN    104050531 A    9/2014
CN    105832553 A    8/2016
(Continued)

OTHER PUBLICATIONS

Midea Group Co Ltd, International Search Report and Written Opinion, PCT/CN2018/117280, dated Feb. 26, 2019, 9 pgs.

*Primary Examiner* — Marcus T Riley
(74) *Attorney, Agent, or Firm* — Morgan, Lewis & Bockius LLP

(57) ABSTRACT

A voice-assisted restocking system includes: a first compartment for storing a plurality of consumable items; a restocking suggestion unit that is configured to receive voice-based restocking suggestions from a remotely located digital assistant server over a network communication interface; a voice output interface configured to output the voice-based restocking suggestions to a user; and a first hardware button that is located in the interior of the first compartment, wherein the first hardware button is configured to: after a first voice-based restocking suggestion from the digital assistant is output by the voice output interface, prompt the user to provide a confirmation input regarding the first voice-based restocking suggestion; and send a respective confirmation signal to the remotely located digital assistant when the first hardware button is activated by the user. A corresponding voice-assisted restocking method is also disclosed.

19 Claims, 6 Drawing Sheets

(51) Int. Cl.
*G06F 3/02* (2006.01)
*G06F 3/0484* (2013.01)
*G06K 9/00* (2006.01)
*G06F 3/16* (2006.01)
*G06Q 50/28* (2012.01)
*G06F 3/0488* (2013.01)

(56) References Cited

U.S. PATENT DOCUMENTS

| | | | | |
|---|---|---|---|---|
| 9,640,174 | B2* | 5/2017 | Noh | G10L 15/00 |
| 2007/0186480 | A1* | 8/2007 | Freeman | G10L 15/26 |
| | | | | 49/358 |
| 2010/0321152 | A1* | 12/2010 | Argudyaev | G06K 9/00046 |
| | | | | 340/5.53 |
| 2011/0210822 | A1* | 9/2011 | Lee | F25D 29/00 |
| | | | | 340/10.1 |
| 2014/0102127 | A1* | 4/2014 | Yum | F25D 29/00 |
| | | | | 62/340 |
| 2014/0188463 | A1* | 7/2014 | Noh | G10L 15/00 |
| | | | | 704/201 |
| 2015/0336786 | A1* | 11/2015 | Gardner | B67D 1/1243 |
| | | | | 222/1 |
| 2018/0059881 | A1* | 3/2018 | Agboatwalla | F25D 29/00 |
| 2019/0279625 | A1* | 9/2019 | Huang | G06F 3/02 |

FOREIGN PATENT DOCUMENTS

| | | |
|---|---|---|
| CN | 107229235 A | 10/2017 |
| CN | 107341915 A | 11/2017 |
| CN | 107481415 A | 12/2017 |
| CN | 107564177 A | 1/2018 |
| JP | 2002373299 A | 12/2002 |
| JP | 2016095768 A | 5/2016 |

* cited by examiner

VOICE-ASSISTED RESTOCKING METHOD AND SYSTEM

FIELD OF THE TECHNOLOGY

The present disclosure relates to the field of voice-assisted restocking systems and methods, and more particularly, to voice-assisted replenishment of household consumable items, such as voice-assisted restocking of a household refrigerator.

BACKGROUND OF THE TECHNOLOGY

Household consumable items need frequent restocking. Consumers have to constantly keep track of the quantities of consumable items (e.g., milk, eggs, flour, toilet paper, shampoo, diapers, canned goods, etc.) throughout the duration between regular shopping trips, which is mentally taxing for most people. Sometimes, if an item is depleted before the consumer's next shopping trip, the consumer may have to make an extra trip to the store to purchase the item especially. Keeping adequate and non-excessive stock of household consumable items is a challenging and difficult chore for many people.

As smart devices and online commerce become more and more prevalent, some software vendors have developed software applications that allow users to set shopping reminders and creating electronic shopping list on their smartphones. However, manually entering the shopping reminders and shopping lists remains difficult and time consuming to users. Some online shopping sites allow users to reorder previously ordered items, and present automatic reordering suggestions based on saved shopping data when the users revisit the online shopping sites. However, such reminders are often presented at a time when the user does not have an interest in making purchases and/or does not have an opportunity to check existing inventories, resulting in reduced effectiveness of the reordering suggestions.

Today, state of the art refrigerators are network-enabled and are controllable through apps installed on smart devices, and/or through touch-screens on the front side of the refrigerators. Some of these smart refrigerators purportedly are capable of detecting the content of the refrigerator and generating refilling reminders that are displayed on the front side touch-screens. However, the accuracy of these reminders are low (e.g., due to inadequate ingredient recognition, quantity determination techniques), resulting in low consumer confidence in the reminders. The touch-screen interactions to make purchases online are also cumbersome since users do not enjoy standing in front of the refrigerator touch screen for long periods of time to do online shopping.

For at least the above reasons, there is a need for an improved restocking system for household consumables, especially for restocking refrigerators.

SUMMARY

As discussed in the background, there is a need for an improved restocking system for household consumables, especially for restocking refrigerators. The present disclosure identifies a number of shortcomings of existing technologies and deficiencies of some solutions that have been proposed in patents and literature. As disclosed herein, a voice-assisted restocking system is proposed, where the voice-assisted restocking system includes one or more hardware buttons that are configured to prompt for user confirmation with regard to real-time restocking suggestions and inquiries uttered by a voice-based digital assistant that is integrated with an appliance, and to affirm an online shopping action that is suggested by the voice-based digital assistant when the one or more hardware buttons are activated by the user. In some embodiments, at least one of the one or more hardware button is located in the interior of the storage compartment containing the household consumables (e.g., located on the interior side of the refrigerator door), so that it is convenient for the user to check the inventory inside the storage compartment (e.g., check the remaining inventory in the refrigerator compartment) and immediately provide the confirmation input without closing the storage compartment or moving away from the storage compartment (e.g., closing the refrigerator door and entering the confirmation on the touch-screen on the exterior of the refrigerator door, or on a smart device). In addition, the hardware button is low cost and easy to maintain; and, unlike touch-screen displays, can function without issue in the low temperature, high moisture, and/or other unfavorable environmental conditions inside of the storage compartment. There are many other advantages of the voice-assisted restocking system and method disclosed herein, which will be apparent to a person skilled in the art based on the disclosure provided herein.

As disclosed herein, in some embodiments, a voice-assisted restocking system, includes: a first compartment for storing a plurality of consumable items; a restocking suggestion unit that is configured to receive voice-based restocking suggestions from a remotely located digital assistant server over a network communication interface; a voice output interface configured to output the voice-based restocking suggestions to a user; and a first hardware button that is located in the interior of the first compartment, wherein the first hardware button is configured to: after a first voice-based restocking suggestion from the digital assistant is output by the voice output interface, prompt the user to provide a confirmation input regarding the first voice-based restocking suggestion; and send a respective confirmation signal to the remotely located digital assistant when the first hardware button is activated by the user.

In some embodiments, a method of providing restocking suggestions, comprising: at an appliance including one or more processors, memory, and a first compartment for storing a plurality of consumable items: detecting a user presence in front of the first compartment; in response to detecting the user presence and in accordance with a determination that the user presence meets restocking suggestion criteria, outputting a first voice-based restocking suggestion through a voice output interface; after the first voice-based restocking suggestion is output by the voice output interface, providing a first prompt, via a first hardware button that is located in the interior of the first compartment, to request a confirmation input from a user regarding the first voice-based restocking suggestion; while providing the first prompt, detecting activation of the first hardware button by a user; and in response to detecting the activation of the first hardware button while the first prompt is provided, sending a respective confirmation signal regarding the first voice-based restocking suggestion to a remotely located digital assistant.

In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device, cause the device to perform or cause performance of the operations of any of the methods described herein.

In accordance with some embodiments, a voice-assisted restocking system, comprising: a first means for storing a plurality of consumable items; a restocking suggestion means for receiving voice-based restocking suggestions from a remotely located digital assistant server over a network communication interface; a voice output means for outputting the voice-based restocking suggestions to a user; a first hardware means that is located in the interior of the first means for storing the plurality of consumables, wherein the first hardware means includes means for, after a first voice-based restocking suggestion from the digital assistant is output by the voice output interface, prompting the user to provide a confirmation input regarding the first voice-based restocking suggestion; and means for sending a respective confirmation signal to the remotely located digital assistant when the first hardware button is activated by the user; and means for performing or causing performance of the operations of any of the methods described herein.

Various advantages of the presently disclosed technology are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
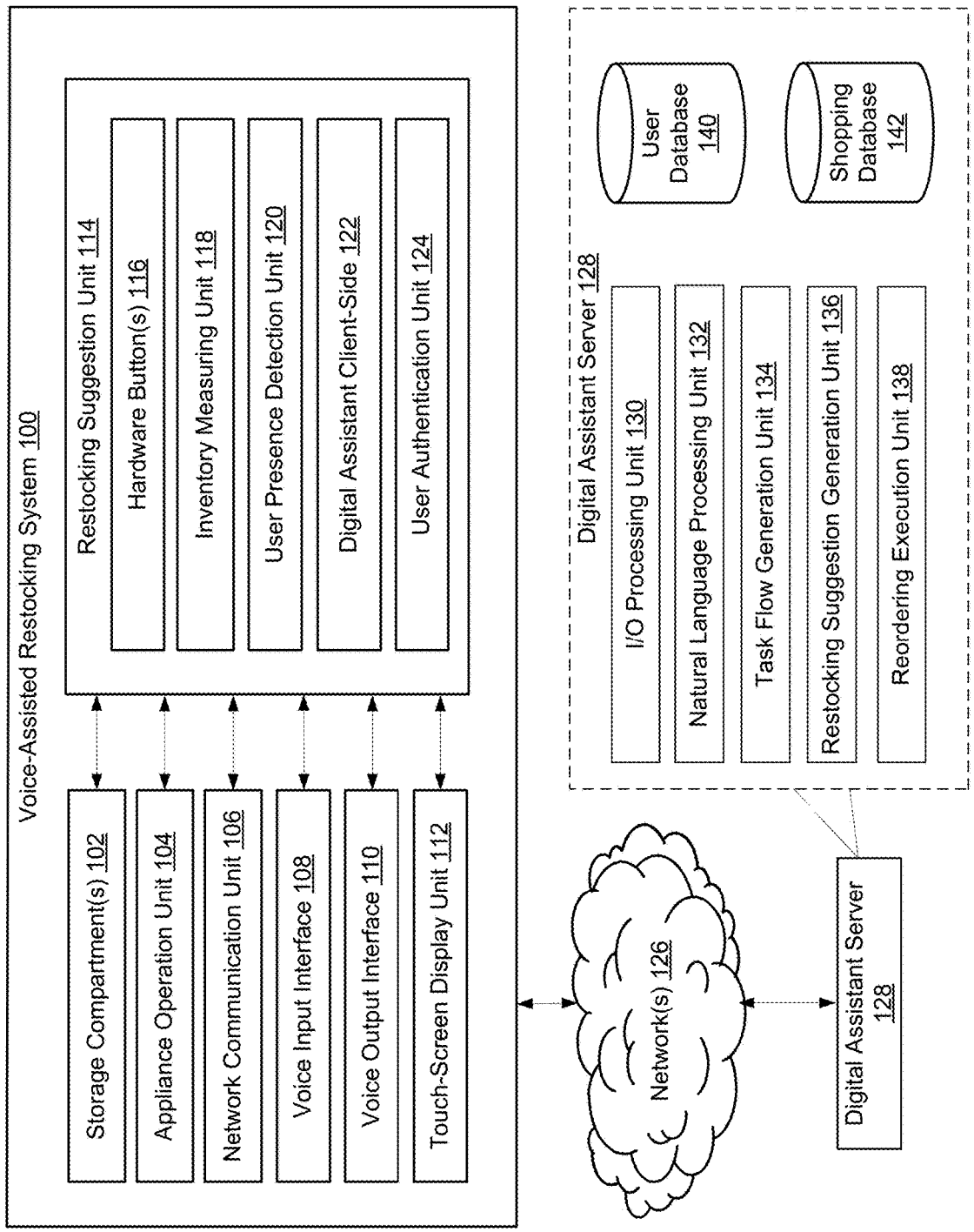
FIG. 1 is a block diagram of an operation environment for a voice-assisted restocking system that includes a compartment for storing a plurality of consumable household items in accordance with some embodiments.

FIG. 1 is a block diagram of an operation environment for a voice-assisted restocking system 100 (e.g., a smart appliance such as a smart refrigerator, a smart medicine cabinet, a smart bathroom cabinet, etc.) that includes a compartment (e.g., a refrigerator compartment or freezer compartment, medicine cabinet, bathroom supply cabinet, etc.) for storing a plurality of consumable household items (e.g., perishable food items or frozen food items, medication and personal care products, bath tissues, wipes, and diapers, etc.) in accordance with some embodiments.

As shown in FIG. 1, the voice-assisted restocking system 100 includes storage compartment(s) 102, an appliance operation unit 104, a network communication unit 106, a voice input interface 108, a voice output interface 110, a touch-screen display 112, and a restocking suggestion unit 114. In some embodiments, the restocking suggestion unit 114 includes one or more hardware buttons 116 for prompting a user to provide confirmation/rejection input regarding a currently output restocking suggestion, an inventory measuring unit 118, a user presence detection unit 120, a digital assistant client-side 122, and a user authentication unit 124. Each of these components may be implemented in hardware, firmware, and/or a combination of hardware, firmware, and instructions stored on computer-readable storage medium that are executable by one or more processors to perform various functions of the components. These components of the voice-assisted restocking system 100 are merely illustrative, and an actual embodiment may include more components or may not include all of the components described herein. In addition, some of the functions of these components may be combined into a new component, or some functions of a component may be split out and/or added to another component.

As shown in FIG. 1, the voice-assisted restocking system 100 includes one or more storage compartments 102, each compartment for storing a plurality of household consumable items. For example, the voice-assisted restocking system 100 can be implemented for a smart refrigerator that includes one or more compartments for storing perishable foods that need refrigeration, one or more compartments for storing frozen food items, and optionally one or more compartment for other household staple food products that do not require refrigeration. Each of the compartment of the smart refrigerator is an enclosed space that has an interior space for storing consumable items, and a respective door or drawer that opens to allow a user to place additional items into the compartment or to take items out of the compartment. For energy efficiency reasons, privacy reasons, and/or safety reasons, the door or drawer of the compartment is kept closed except when a user opens it to retrieve an item or placing an item into the compartment. In some embodiments, the interior conditions of the compartment are maintained under certain conditions, e.g., with limitations on temperature, moisture, light and/or air flow, etc., through various means (e.g., compressors, coolant, ventilation, humidifier, vacuum, etc.). In some embodiments, the interior conditions of the compartment make it unfeasible to install certain conventional input and output devices in the interior of the compartment, such as touch-screen displays, microphones, and/or speakers, due to moisture, temperature, and/ or air-flow conditions in the compartment. In some embodiments, it is unfeasible to make the walls and the door of the compartment transparent, e.g., due to energy efficiency and privacy considerations.

Due to these special characteristics of the storage compartments of some smart appliances, conventional refill reminder solutions do not work very well. For example, because the user cannot easily see into the storage compartment(s), the user cannot easily make a shopping list by a glance at the storage compartment. Due to the energy, safety, and privacy considerations, the compartment door cannot be made transparent or left open for extended period of time, so the user has to open the compartment door to check inventory before making or confirming a restocking decision. Conventional methods of reminding the user to restock an item (e.g., eggs, toothpaste, bath tissue, etc.) on a smart device does not work well, because the user may not be physically near the compartment for storing that item (e.g., refrigerator compartment, medicine cabinet, bathroom cabinet, etc.) and cannot conveniently check the actual inventory of the item before confirming the restocking suggestion. Reminding the user to restock an item via a reminder displayed on a touch-screen display installed on the exterior side of the compartment door (e.g., on a refrigerator door, medicine cabinet door, or bathroom cabinet door, etc.) also does not work well, because, when the user sees the restocking reminder on the touch-screen display, the user has to open the compartment door to check the inventory inside the compartment, and then close the compartment door to enter a confirmation or rejection input on the touch-screen display. If there are multiple restocking recommendations, the user may have to repeatedly open and close the compartment door to check inventory inside and then provide the confirmation/rejection input outside. This is cumbersome, annoying, and negatively impact the internal conditions of the compartment, and wastes energy.

Some state-of-the-art appliances also feature a voice-based interaction model that allows the user to interact with a digital assistant using speech inputs and audio outputs (e.g., speech or audio alerts). Using voice-based reminders and voice-based confirmation/rejection helps to overcome some of the issues described above, e.g., with respect to touch-screens and smart devices. However, state of the art speech recognition and intent deduction technology still have errors that are unavoidable due to various reasons, such as low sound quality, high noise, user accents, uncommon terms, new products and vocabulary, etc. These speech recognition and intent deduction errors are particularly problematic during an interaction that involves restocking household items and making payment for these restocking decisions. If the user does not have confidence in the accuracy of the speech recognition and intend deduction, the user may forgo utilizing the digital assistant for restocking suggestions and restocking purchases altogether. Even if the user does still try to utilize the restocking suggestions and automatic restocking purchases, if the digital assistant makes a mistake in the interpretation of the user's speech input, the user may end up with the wrong items and/or unnecessary items, or has to deal with shortage of an item due to a failed restocking attempt. Even if the digital assistant can include repeated fail-save mechanisms, such as repeated voice confirmation, or confirmation via the touch-screen, these additional mechanisms merely make the restocking process more cumbersome, without truly resolve the problem.

In the present disclosure, the voice-assisted restocking system 100 still utilizes voice-based inputs and outputs to facilitate the restocking of household consumables. The voice-assisted restocking system 100 includes a voice input interface 108, including, e.g., one or more microphones located on the exterior and/or interior of the storage compartment. In some embodiments, if the internal conditions of the compartment are not suitable for the operation of the voice input interface, the voice input interface is only available on the exterior of the storage compartment. Similarly, the voice-assisted restocking system 100 includes a voice output interface 110 for outputting the voice-based inquiries, suggestions, and instructions from the digital assistant to the user. In some embodiments, if the internal conditions of the compartment are not suitable for the operation of the voice output interface, the voice output interface is only available on the exterior of the storage compartment. In some embodiments, the digital assistant can utilize voice input interface and voice output interface provided by other smart appliances located in the vicinity of the storage compartment. In some embodiments, the voice-assisted restocking system 100 includes a touch-screen display unit 112 that is configured to display a graphical user interface and receive user input via touch inputs and gestures.

In some embodiments, the voice-assisted restocking unit 114 communicates with the digital assistant server 128 over a network 126. The communication is carried out by the digital assistant client-side 122 through the network communication unit 106. The term "digital assistant" may be replaced with "home assistant", "virtual assistant," "intelligent automated assistant," "voice-based digital assistant," "voice assistant", or "automatic digital assistant,", and refers to an information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider (e.g., shopping website severs) or sending a machine command to a controlled device); and generating output responses to the user in an audible (e.g., speech) and/or visual form. As disclosed herein, in some embodiments, the digital assistant is configured to gather item inventory information, user preference information, and restocking needs information from various sources, and generate restocking suggestions (e.g., regarding which items need to be restocked, at what time, and at what price, and from where), requesting user confirmation of the restocking suggestions (e.g., providing the restocking suggestions to the user via various output means, requesting the user's input via various input means, etc.), and executing the restocking actions (e.g., placing online orders and reorders, and making online payments for the orders and reorders) on behalf of the user.

Examples of the communication network(s) 126 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol.

As shown in FIG. 1, in some embodiments, a digital assistant system is implemented according to a client-server model. The digital assistant system includes a client-side portion 122 executed on the voice-assisted restocking system 100 (e.g., as part of the restocking suggestion unit 114), and a server-side portion executed on a digital assistant server system 128. In some embodiments, the digital assistant server 128 includes a client-facing I/O processing unit 130, one or more processing modules, including natural language processing unit 132, task flow generation unit 134, restocking suggestion generation unit 136, and reordering execution unit 138. The digital assistant server 128 further includes user database 140 and shopping database 142.

The digital assistant server system 128 can be implemented on at least one data processing apparatus and/or a distributed network of computers. In some embodiments, the server system 128 also employs various virtual devices and/or services of third party service providers (e.g., third-party cloud service providers) to provide the underlying computing resources and/or infrastructure resources of the server system 128.

As disclosed herein, for a respective type of voice-assisted restocking system 100, the voice-assisted restocking system 100 has a set of native functions that are enabled and performed by the appliance operation unit 104. For example, if the voice-assisted restocking system is a smart refrigerator, the appliance operation unit includes the mechanisms for maintaining the required refrigeration and freezer temperatures. If the voice-assisted restocking system is a smart medicine cabinet, the appliance operation unit includes the mechanism for maintaining the temperature and humidity level required for the medicines stored inside and child-proofing mechanisms. If the voice-assisted restocking system is a smart bathroom cabinet, the appliance operation unit includes the mechanism for maintaining the required ventilation and dryness required for the personal care supply, bath tissues, etc. stored inside.

In the present disclosure, the voice-based restocking system 100 includes an inventory measuring unit 118. In some embodiments, the inventory measuring unit 118 includes cameras inside the storage compartment, weight sensors located at various locations in the storage compartment, light sensors located at various locations in the storage compartment, etc. that are used to determine whether a particular item stored in the storage compartment 102 are due to be replenished. For example, in the refrigerator eggs storage compartment, if the weight sensor or light sensors placed in all of the egg placement locations indicate that there are no eggs present in 80% of the egg storage compartment, the information is optionally sent to the digital assistant server through the digital assistant client side, and the digital assistant server 128 can utilize this information to generate a restocking suggestion for eggs and send it back to the digital assistant client-side. In some embodiments, the inventory measuring unit 118 also keeps track of how often and how much of each item is replenished in order to establish a baseline inventory quantity for each item. In some embodiments, the inventory measuring unit 118 optionally uses RFID scanner technology to quickly, without user intervention, obtain the item type and item quantity whenever the user places an item into the storage compartment and/or takes an item out of the storage compartment.

In some embodiments, the restocking suggestion unit 114 further includes a user presence detection unit 120. The user presence detection unit 120 determines when the user is in the vicinity of the voice-assisted restocking system 100 (e.g., the refrigerator), and/or whether the user is in a state or performing an action that indicates a good opportunity to provide restocking suggestions to the user and requesting confirmation/rejection input regarding the restocking suggestions. For example, the user presence detection unit 120 includes motion sensors and/or light sensors that detects whether the door of the compartment 102 has been opened by the user, or if the user is standing in front of the compartment, or if the user is taking items out of the compartment or putting items into the compartment, etc. Based on the user's state and/or action, and optionally, based on other considerations (e.g., time, user's schedules, whether the user is alone or has company, etc.), the user presence detection unit 120 determines whether criteria for providing restocking suggestion now are met. In some embodiments, the user presence detection unit 120 optionally uses the digital assistant's conversation ability to check with the user regarding whether it is a good time to provide the restocking suggestions. In general, the user presence detection unit 120 uses various criteria to determine whether it is convenient for the user to open the compartment and check on the inventory status for confirming or rejection a restocking suggestion. In some embodiments, the user presence detection unit 120 uses different sets of criteria to determine the timing for providing restocking suggestions based on how many restocking suggestions need to be provided and confirmed, and how urgent those restocking needs are.

In some embodiments, the restocking suggestion unit 114 further includes a user authentication unit 124. The user authentication unit 124 can include a fingerprint sensor, an ID scanner, a camera, and/or facial recognition unit, etc. to determine whether the user is authorized to open the compartment and making the restocking decisions. In some embodiments, the fingerprint sensor is integrated with the hardware buttons 116 of the voice-assisted restocking system.

In the present disclosure, one or more hardware buttons 116 are installed in the interior side of the storage compartment, e.g., on the interior side of the compartment door or drawer. In some embodiments, these hardware buttons are designed to include insulation layers, moisture barriers, heat barriers, and/or other protection against the internal conditions of the storage compartment, such that they would not be adversely affected when remaining in the interior of the compartment 102. The hardware buttons are configured to detect a user input, such as a press input, a tap input, a swipe input, a pulling input, a slide input, etc. and transmit a corresponding signal to a control unit (e.g., the restocking suggestion unit 114 or the digital assistant client 122, or the digital assistant server 128, etc.) regarding the user input. The signal is treated as a confirmation input or a rejection input with respect to a currently output restocking suggestion provided by the restocking suggestion unit 114.

In some embodiments, the hardware buttons 116 are used as an additional means to increase the confidence of the voice-based interactions between the user and the digital assistant. For example, by physically activating the hardware buttons 116, the user can confirm a voice-based suggestion (e.g., restocking item, quantity, time, payment, etc.) without using a voice input (e.g., avoiding speech recognition and intent deduction errors) and without using a touch-screen input on the exterior side of the storage compartment. By requiring an interaction with the physical hardware button, the user's shopping awareness is increased, and the user can be more confident about his/her knowledge and control over the purchase actions performed by the digital assistant. In addition, since the physical button is placed on the compartment, the provision of restocking suggestions and the user's confirmation input are required to converge at a location where the user can easily check the inventory status in the compartment, therefore, the user can be more confident about his/her restocking decisions, and it is more likely that the digital assistant will receive the restocking confirmation it needs to proceed with the reordering actions with less chance of mistakes.

In addition, by introducing the physical hardware button as a mechanism for confirming a restocking suggestion and making a purchase, the barrier for shopping and restocking items is lowered, and children and people with physical disabilities (e.g., people with reduced mobility) can perform shopping in their homes without being technology savvy or dexterous enough to manipulate a smart device or touch-screen user interface on the exterior side of the storage compartment.

As set forth earlier, this physical confirmation mechanism allows the user to check inventory on the spot, and confirm immediately based on fresh knowledge. The confirmation button is placed on the interior of the storage compartment, so the user does not have to repeatedly open and close the compartment to enter the confirmation input for multiple suggestions. The user also does not have to remember the inventory status for many items when providing the confirmation input for multiple items one by one.

Some existing online purchase mechanisms include Amazon's dash button, where each button corresponds to a reorder request for a respective product. The dash button is easy to use, but the dash button is detached from a storage compartment and does not offer automated reminders that are provided at a convenient moment for the user to check inventory. It also does not provide an option to modify an order (e.g., change quantity or check update price) that is associated with the button. There is also no visual confirmation about whether the order is placed or not. Unlike the dash button, the hardware confirmation button is installed on the storage compartment, and includes visual and/or audio prompt and feedback functions that correspond to the restocking suggestion that has just been provided by the voice-based restocking system. Thus, the hardware button can be used to confirm multiple types of restocking recommendations and for any type, amount, price of items.

The hardware button in combination with the voice-based restocking suggestions also have advantages over the touch-screen-based restocking suggestions and confirmation scheme. For example, the hardware button is simpler, more robust under various operation conditions (e.g., high moisture, low temperature, high noise, etc.). The hardware buttons are also cheaper and easier to make, maintain, and replace. The buttons are small in size, and do not have a complicated circuit system or processing module for detecting input and transmitting the signals to the network communication interface or the digital assistant. The buttons are easy to use, a child and a disabled person can operate the button without problem.

In some embodiments, one or more hardware buttons are located on the exterior side of the storage compartment, and the user can use either the buttons inside the storage compartment or the buttons outside of the storage compartment to confirm a restocking suggestion that has been provided via the voice output interface or the touch-screen display. For example, if the user has opened the storage compartment to check inventory status after hearing a first restocking suggestion, the user can confirm the first restocking suggestion using the inside hardware button, and close the compartment, and confirm a subsequently output restocking suggestion for a different item using the outside hardware button, provided that the user still remembers the inventory status of the item from looking in the compartment earlier.

In some embodiments, the user can activate the hardware button on the outside of the storage compartment to indicate to the digital assistant that the user is interested in hearing the restocking suggestions, and then proceeds to open the compartment and confirm the restocking suggestions using the inside hardware buttons.

In some embodiments, the user can activate the inside hardware button when no restocking suggestion is being provided. In response to detecting the activation of the inside hardware button when no restocking suggestion has just been provided, the restocking suggestion unit triggers the voice input interface to capture user's voice inputs describing the inventory status of various items in the storage compartment, and/or request for setting reminders to recheck the inventory status or to restock various items for a future time.

In some embodiments, the hardware buttons 116 include lights (e.g., LED lights) and tactile output generators that provide visual prompt and haptic feedback regarding a request for confirmation for a currently output suggestion and feedback regarding receipt of the user's confirmation/rejection input.

In some embodiments, various components of the voice-assisted restocking system 100 communicate through one or more communication lines. The various units of the voice-assisted restocking system 100 are implemented by instructions stored on non-transitory computer-readable medium (e.g., memory) which when executed by one or more processors of the voice-assisted restocking system, cause the processors to perform the various operations needed to implement the methods described herein.

In some embodiments, the hardware buttons can be used to trigger an interaction with the digital assistant for purchasing other items through the regular natural language processing and intent deduction process, and the hardware button provides a means for physical confirmation for each purchase and payment (e.g., purchase of other household consumable items that are not stored in the storage compartment, such as cleaning supplies, beverages, toiletries, pantry food staples, etc.) to be made through the digital assistant.

Other aspects of the hardware buttons 116 and various components of the voice-assisted restocking system 100 are provided in the examples and disclosures below.

Figure 2:
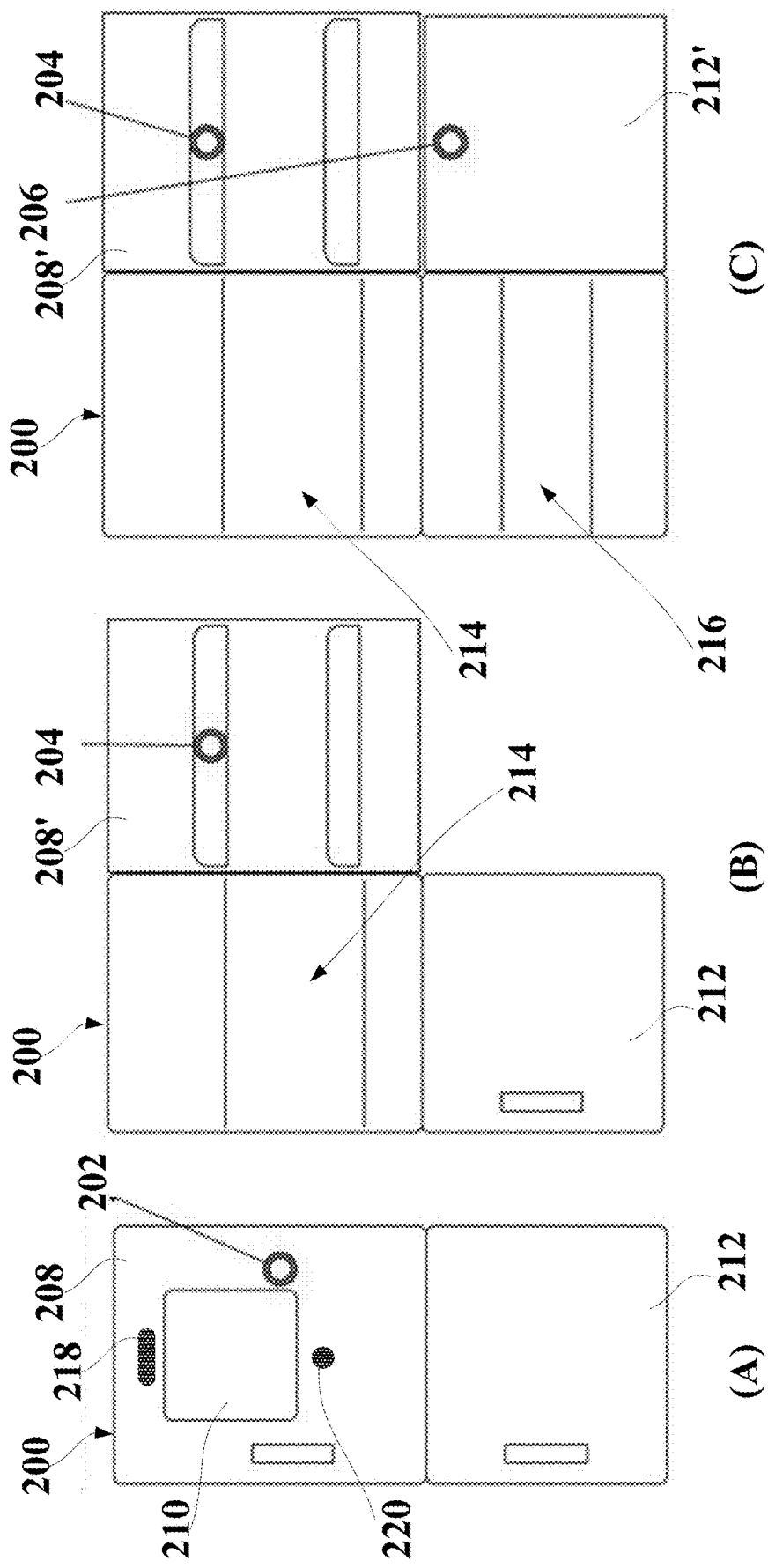
FIG. 2 includes block diagrams illustrating an exemplary refrigerator with a voice-assisted restocking system in accordance with some embodiments.

FIG. 2 include block diagrams illustrating an exemplary refrigerator with a voice-assisted restocking system in accordance with some embodiments. As shown in FIG. 2(A), the voice-assisted restocking system is a smart refrigerator 200 with two compartments 214 and 216. The upper compartment 214 has a door 208. The lower compartment 216 has a door 212. In FIG. 2(A), the doors 208 and 212 are in the closed state. On the exterior side of the door 208, there is a speaker 218 for outputting restocking suggestions and other outputs of the digital assistant, and a microphone 220 for capturing the user's voice inputs to the digital assistant. In addition, in some embodiments, a touch-screen display 210 is installed on the exterior side of the door 208. In some embodiments, a hardware button 202 for detecting user's confirmation input and/or activation input is installed on the exterior side of the door 208.

FIG. 2(B) illustrates the smart refrigerator 200 with its upper compartment 214 open. A hardware button 204 is installed on the interior side of the door 208'. Food items can be stored on the interior space of the compartment 214 (e.g., on shelves) and on the shelves on the interior side of the door 208'. FIG. 2(C) illustrates the smart refrigerator 200 with both its upper compartment 214 and its lower compartment 216 open. A hardware button 206 is installed on the interior side of the door 212'. In some embodiments, when the door 208 is opened, the restocking suggestions are for items stored in the upper compartment 214, and the confirmation received on button 204 are also for the restocking suggestions for items stored in the upper compartment 214. Similarly, when the door 212 is opened, the restocking suggestions are for items stored in the lower compartment 216, and the confirmation received on button 206 are also for the restocking suggestions for items stored in the lower compartment 216.

The above examples are provided merely for illustrative purposes. More details of the structure and functions of the smart refrigerator are set forth with respective to various embodiments.

Figure 3:
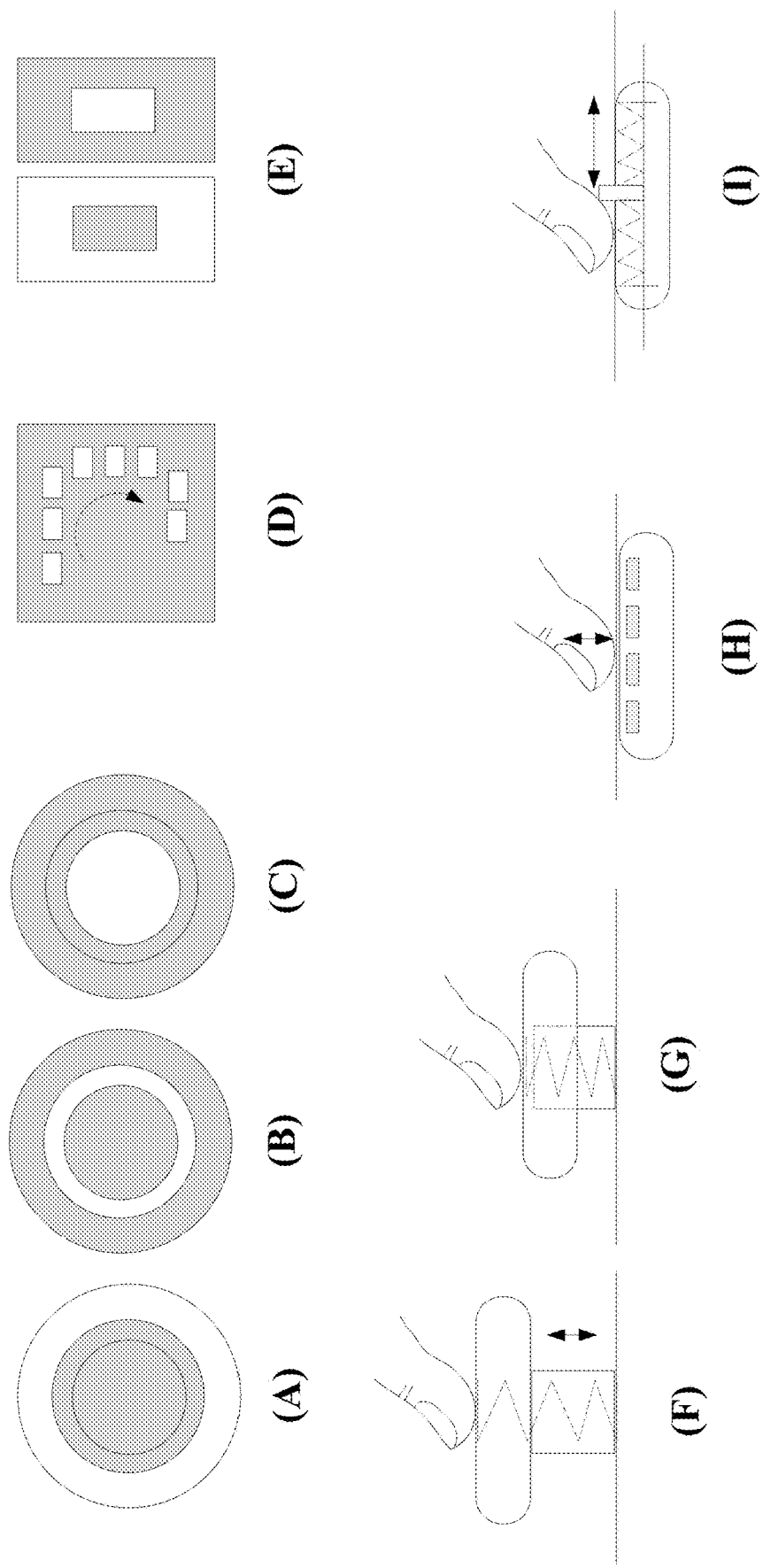
FIG. 3 includes schematic diagrams of various hardware buttons used in a voice-assisted restocking system in accordance with some embodiments.

FIG. 3 includes schematic diagrams of various hardware buttons used in a voice-assisted restocking system in accordance with some embodiments.

FIGS. 3(A)-3(C) illustrates a hardware button that is configured to provide a light pattern that moves from the peripheral region to the central region and then repeat. The hardware button can also generate other light patterns, each corresponding to a respect type of restocking suggestions. In some embodiments, the hardware button is configured to display a short textual word or phrase (e.g., "1 dz eggs"), or a graphic symbol (e.g., an egg symbol) that corresponds to the currently output restocking suggestion (e.g., reorder 1 dozen eggs). In some embodiments, the light pattern is animated or flashes for a predefined period of time to indicate a duration in which user input is requested. If no input is received by the button during that period of time, the light pattern changes or stops, and a new interaction cycles starts. The absence of user input on the button within the predefined period of time is optionally interpreted as a default or rejection input.

FIG. 3(D) shows an alternative button and light pattern that cycles through a series of sub-regions on the button. The direction of the pattern animation indicates whether the input is for approval or disapproval of the suggestions. For example, the clockwise rotation of the light pattern indicates approval, and if a user's press input is detected on the button when the light pattern is moving clockwise, the input is interpreted as an approval input. After a period of clockwise rotation, the light pattern turns counterclockwise, and if a user's press input is detected on the button when the light pattern is moving counterclockwise, the input is interpreted as a rejection input. The light pattern cycles between clockwise, and counterclockwise multiple times before the response period expires.

FIG. 3(E) shows another button that includes a left button for approval input and a right button for rejection input. The user can press the left or right button to indicate approval or rejection of the currently output restocking suggestion.

Other visual prompt and feedback that are presented on the hardware button(s) optionally include glittering, flashing, product icons, symbols indicating approval or rejection, countdowns, trademarks for products, price/payment values, etc.

In some embodiments, the appearance state of the button also changes depends on the types of input that has been detected on the button. The types of input accepted by the button(s) include press inputs, touch inputs, push inputs, tap inputs, long press inputs, hard press inputs, swipe inputs, click inputs, rotation inputs, sliding inputs, swiping inputs, etc. Each type of inputs may be associated with a respective type of meaning with respect to the actions of the digital assistant or the restocking suggestion unit.

FIGS. 3(F)-3(I) illustrate the various types of buttons that can be implemented. For example, FIGS. 3(F)-3(G) show a spring-loaded button that is pressed to register a user input. FIG. 3(H) illustrates a solid-state button that includes a touch-sensors and/or pressure sensor that is placed under a surface layer, and that is flush with the surrounding surface. The solid-state button can detect touch inputs, such as taps, presses, swipes, etc. The solid-state button is water-proof and moisture-proof, and may optionally include tactile output generators that provide haptic feedback for the input that has been detected. FIG. 3(I) illustrates a spring-loaded sliding switch that registers a user input when the user pulls the switch pass a threshold location along the surrounding surface. FIG. 3 is merely illustrative. Many other types of hardware buttons may be utilized for the voice-assisted restocking system disclosed herein.

In some embodiments, a voice-assisted restocking system (e.g., a smart refrigerator, a smart medicine cabinet, a smart bathroom cabinet, etc.), includes: a first compartment (e.g., a refrigerator compartment) for storing a plurality of consumable items (e.g., an interior of the first compartment is subject to moisture conditions and temperature conditions that are unfavorable to operations of touch-screen displays and non-water-proof electronic components); a restocking suggestion unit (e.g., part of a digital assistant client located at the refrigerator, including one or more processors and memory, and instructions that, when executed by the one or more processors, cause the processors to perform the client-side functions of the digital assistant, such as user-facing I/O functions, server-facing I/O functions, controlling and monitoring of the hardware button in the interior of the refrigerator compartment) that is configured to receive voice-based restocking suggestions from a remotely located digital assistant server (and sending voice inputs uttered by a user to the remotely located digital assistant server) over a network communication interface; a voice output interface (e.g., a speaker located in the interior wall of the refrigerator compartment or, the exterior wall of the refrigerator compartment, or on the edge of a shelf within the refrigerator compartment) configured to output the voice-based restocking suggestions to a user; and a first hardware button (e.g., a water-proof and moisture-proof button (e.g., moisture-proof solid-state button or a moisture-proof mechanical button, that is pressure-sensitive, or mechanically activatable) that is located in the interior of the first compartment (e.g., located in the interior wall of the refrigerator compartment near the refrigerator door, or, on the interior side of the refrigerator door, or on the edge of a shelf near the refrigerator door), wherein the first hardware button is configured to: after a first voice-based restocking suggestion from the digital assistant is output by the voice output interface, prompt the user to provide a confirmation input (e.g., by outputting a respective light pattern or audio pattern corresponding to the suggestion type of the first voice-based restocking suggestion) regarding the first voice-based restocking suggestion; and send a respective confirmation signal to the remotely located digital assistant (e.g., through the restocking suggestion unit and the network communication interface) when the first hardware button is activated by the user (e.g., by the user pressing on the first hardware button or tapping on the first hardware button, or pulling on the first hardware button, or sliding a toggle or switch on the hardware button, etc.).

In some embodiments, the voice-assisted restocking system further includes a voice input interface (e.g., a microphone located in the interior wall of the refrigerator compartment or, the exterior wall of the refrigerator compartment, or on the edge of a shelf within the refrigerator compartment) configured to capture the voice inputs uttered by the user before the voice inputs are sent by the network communication unit to the remotely located digital assistant server. In some embodiments, the voice input interface is located on the exterior side of the first compartment. For example, the microphone is located on the front-side of the refrigerator door, along with a touch-sensitive display that is an input/output interface to the remotely located digital assistant. In some embodiments, the voice input interface includes a first microphone located on the exterior side of the refrigerator door, and a second microphone located on the interior side of the refrigerator door. The first microphone on the exterior side of the door is used to capture the user's utterance when the refrigerator door is closed, and the second microphone located on the interior side of the refrigerator door is used to captured the user's utterance when the refrigerator door is closed. In some embodiments, the restocking suggestion unit starts to interact with the user (e.g., alerting the user that certain items in the refrigerator compartment may be approaching expiration date, running out, or depleted, and suggesting a restocking of those items) through the microphone, speaker, and/or touch-screen display that are located on the exterior side of refrigerator door when the refrigerator door is closed, and continues with the interaction (e.g., continues with restocking suggestions, requesting user confirmation of a restocking purchase to be made through the digital assistant server, etc.) using the speaker, microphone, and the hardware button that are located on the interior side of the refrigerator door when the user opens the refrigerator door (e.g., to check on the items currently stored in the refrigerator compartment). In some embodiments, the user provides a rejection input with regard to the first restocking suggestion after the first restocking suggestion has been output by the voice output interface. In response to receiving the user's voice-based rejection input through the voice input interface, the restocking suggestion unit moves on to provide additional restocking suggestions, if available, and sends the received rejection input to the digital assistant server over the network communication interface. In some embodiments, the first hardware button immediately stops prompting the user for confirmation input (e.g., ceasing to provide the light pattern or audio pattern), when the user's voice rejection input has been received.

In some embodiments, the first compartment is an enclosed compartment (e.g., a compartment for storing fruits and vegetables, a compartment for storing meat, and a compartment for storing frozen food, etc.) of a refrigerator; the enclosed compartment of the refrigerator has a door with an interior side facing an interior of the enclosed compartment when the door is in a closed state, and with an exterior side facing the an exterior of the enclosed compartment when the door is in an open state; and the first hardware button is located on the interior side of the door within the interior of the enclosed compartment when the door is in the closed state.

In some embodiments, the first hardware button includes a visual feedback component (e.g., a group of LED light bulbs) that is configured to generate a respective light pattern (e.g., a static light pattern, or an animated light pattern) corresponding to a selected one of a plurality of confirmation request types in accordance with a suggestion type (e.g., a suggestion type for making purchase of a suggested quantity, a suggestion type for making a payment of a suggested amount, a suggestion type for selecting a suggested product for restocking, a suggestion type for repeating a previous order of a respective product, etc.) of the first voice-based restocking suggestion. For example, in some embodiments, the first hardware button is lit up with a first light pattern and/or output a first audio signal each time the digital assistant outputs a suggestion of a first suggestion type (e.g., "Shall I proceed to reorder a dozen of eggs?" "Please confirm reordering of one gallon of milk.", etc.). The first hardware button is lit up with a second light pattern and/or output a second audio signal that is distinct from the first light pattern/first audio signal each time the digital assistant outputs a suggestion of a second suggestion type (e.g., "Shall I proceed with making a payment of $3.55 for the one dozen eggs?" "Please confirm payment of $4.5 for reordering the one gallon of milk.", etc.).

In some embodiments, the voice-assisted restocking system includes a second hardware button (e.g., a water-proof and moisture-proof button (e.g., moisture-proof solid-state button or a moisture-proof mechanical button, that is pressure-sensitive, or mechanically activatable) that is located adjacent to the first hardware button in the interior of the first compartment (e.g., located in the interior wall of the refrigerator compartment near the refrigerator door, or, on the interior side of the refrigerator door, or on the edge of a shelf near the refrigerator door), wherein the second hardware button is configured to: after a second voice-based restocking suggestion from the digital assistant is output by the voice output interface, prompt the user to provide a rejection input (e.g., by outputting a respective light pattern or audio pattern corresponding to the suggestion type of the first voice-based restocking suggestion) regarding the second voice-based restocking suggestion; and send a rejection signal to the remotely located digital assistant (e.g., through the restocking suggestion unit and the network communication interface) when the second hardware button is activated by the user (e.g., by the user pressing on the second hardware button or tapping on the second hardware button, or pulling on the second hardware button, or sliding a toggle or switch on the hardware button, etc.). In some embodiments, only a single button is necessary to receive both the confirmation input regarding a respective restocking suggestion and the rejection input regarding the respective restocking suggestion. For example, the light pattern or audio signal is only provided on the first hardware button for a finite period of time, and if the first hardware button is activated by user input within the finite period of time, the input is treated as a confirmation input, and if the first hardware button is not activated by any user input within the finite period of time, the absence of user input is treated as a rejection input and a rejection signal is sent to the remotely located digital assistant after that finite period of time.

In some embodiments, the first hardware button is configured to send the confirmation signal to the remotely located digital assistant when the first hardware button is activated by the user within a threshold amount of time after the first voice-based restocking suggestion is output by the voice output interface, and the first hardware button is further configured to send a respective rejection signal to the remotely located digital assistant when the first hardware button is not activated within the threshold amount of time after the first voice-based restocking suggestion is output by the voice output interface. In some embodiments, the voice-assisted restocking system receives and outputs a second voice-based restocking suggestion that is distinct from the first voice-based restocking suggestion if no user confirmation input is received on the first hardware button within the threshold amount of time after the first voice-based restocking suggestion was output by the voice output interface. For example, the digital assistant may generate a series of restocking suggestions (e.g., "Please confirm which of the following items should be reordered: one dozen eggs . . . one gallon of milk . . . one pound of ground chicken . . . one dozen canned soda, . . . "), after name of each of the food items is output by the voice output interface, the first hardware button blinks to prompt the user to press the button to confirm. If the user presses the button within the threshold amount of time (e.g., 5 seconds) after a first food item is announced, the reordering of that first food item is confirmed. Then the name of the next food item is output by the voice output interface and the first hardware button blinks to prompt the user to activate the button to confirm the reordering of the next food item. If the user did not press the button within the threshold amount of time after the first food item is announced, the reordering of that first food item is rejected, and name of the next food item is output by the voice output interface and the first hardware button blinks to prompt the user to activate the button to confirm the reordering of the next food item.

In some embodiments, the voice-assisted restocking system includes: a touch-screen display that is configured to display the first restocking suggestion and a confirmation of the first restocking suggestion in accordance with user activation of the first hardware button. For example, a touch-screen display is included on the exterior side of the door of the refrigerator compartment. When the first restocking suggestion is output by the voice output interface of the voice-assisted restocking system, the restocking suggestion unit checks to determine whether the door of the refrigerator compartment is closed or open. In accordance with a determination that the refrigerator door is closed, the touch-screen display displays the first restocking suggestion and optionally additional information related to the first restocking suggestion; and in accordance with a determination that the refrigerator door is open, the touch-screen display forgoes displaying the first restocking suggestion because the user presumably is not going to be able to see the touch-screen display on the outside of the refrigerator door. In some embodiments, in accordance with a determination that the confirmation input regarding the first restocking suggestion has been received while the refrigerator door was open, and in accordance with a determination that the refrigerator door is now closed after the confirmation input regarding the first restocking suggestion has been received, the touch-screen display displays the first restocking suggestion and the confirmation of the first restocking suggestion. So that if the user wishes to make any correction or modifications to the suggested restocking action, the user can perform it on the touch-screen display.

In some embodiments, the restocking suggestion unit is configured to: cause display of the first restocking suggestion on the touch-screen display in accordance with a determination that the first compartment is in a closed state (e.g., the restocking reminders are displayed on the touch-screen display when the refrigerator door is closed); and cause the first hardware button to generate a light pattern to prompt for the confirmation input regarding the first restocking suggestion in accordance with a determination that the first compartment has switched from the closed state to an open state (e.g., the refrigerator door is opened by the user while the restocking reminders were displayed on the touch-screen display). In some embodiments, the restocking suggestion unit is further configured to cause the touch-screen display to cease to display the first restocking suggestion in accordance with a determination that the first compartment has switched from the open state back to the closed state after the confirmation input has been received on the first hardware button. For example, after the user has confirmed the reordering of a dozen eggs by pressing the first hardware button, when the user closes the door of the refrigerator, the reminder for restocking the dozen eggs is no longer displayed on the touch-screen display.

In some embodiments, the voice-assisted restocking system includes: a third hardware button (e.g., a solid-state button or a mechanical button, that is pressure-sensitive, or mechanically activatable) that is located on an exterior of the first compartment (e.g., located in the interior wall of the refrigerator compartment near the refrigerator door, or, on the interior side of the refrigerator door, or on the edge of a shelf near the refrigerator door), wherein the third hardware button is configured to: after a third voice-based restocking suggestion from the digital assistant is output by the voice output interface, prompt the user to provide a confirmation input (e.g., by outputting a respective light pattern or audio pattern corresponding to the suggestion type of the third voice-based restocking suggestion) regarding the third voice-based restocking suggestion; and send a respective confirmation signal to the remotely located digital assistant (e.g., through the restocking suggestion unit and the network communication interface) when the third hardware button is activated by the user (e.g., by the user pressing on the third hardware button or tapping on the third hardware button, or pulling on the third hardware button, or sliding a toggle or switch on the third hardware button, etc.). In some embodiments, the hardware button on the exterior of the refrigerator door can be used after the refrigerator door is closed to continue an interaction that has been started or in progress when the refrigerator door was open. For example, when the voice output interface is outputting a series of restocking suggestions ("Please confirm the following reordering items: one dozen eggs, . . . one gallon of milk . . . , one dozen canned soda, . . . etc."), the user pressed on the exterior hardware button to confirm a currently output reordering item (e.g., one dozen eggs) when the refrigerator door was closed; the user then opened the refrigerator door while the restocking suggestions are continually being output, the user pressed on the interior hardware button to confirm another currently output reordering item (e.g., one gallon of milk); the user then closed the refrigerator door while the restocking suggestions are continually being output, and the user pressed on the exterior button to confirm the next currently output reordering item (e.g., one dozen canned soda). In some embodiments, the restocking suggestion unit automatically determines which hardware to use to prompt the user to provide the confirmation input for a currently output restocking suggestion based on the open/closed state of the first compartment, so that the interaction between the user and the voice-assisted restocking system continue seamlessly when the user uses the refrigerator, and checks the stocks of food items within the refrigerator. In some embodiments, the hardware buttons on the exterior of the first compartment and in the interior of the first compartment are identical. In some embodiments, the hardware button on the exterior of the first compartment does not have the extra moisture-proof mechanisms that the hardware button in the interior of the first compartment has (e.g., to reduce cost). In some embodiments, the functions and behaviors as described with respect to the first hardware and the second hardware button in the interior of the first compartment are applicable to the third hardware button on the exterior of the first compartment, and are not repeated exhaustively in the interest of brevity.

In some embodiments, the voice-assisted restocking system includes: a second compartment (e.g., a freezer compartment) that is distinct from the first compartment (e.g., an interior of the second compartment is subject to moisture conditions and temperature conditions that are unfavorable to operations of touch-screen displays and non-water-proof electronic components); a fourth hardware button (e.g., a water-proof and moisture-proof button (e.g., moisture-proof solid-state button or a moisture-proof mechanical button, that is pressure-sensitive, or mechanically activatable) that is located in the interior of the second compartment (e.g., located in the interior wall of the freezer compartment near the freezer door, or, on the interior side of the freezer door, or on the edge of an internal compartment near the freezer door), wherein the fourth hardware button is configured to: after a fourth voice-based restocking suggestion from the digital assistant is output by the voice output interface, prompt the user to provide a confirmation input (e.g., by outputting a respective light pattern or audio pattern corresponding to the suggestion type of the fourth voice-based restocking suggestion) regarding the fourth voice-based restocking suggestion; and send a respective confirmation signal to the remotely located digital assistant (e.g., through the restocking suggestion unit and the network communication interface) when the fourth hardware button is activated by the user (e.g., by the user pressing on the first hardware button or tapping on the first hardware button, or pulling on the first hardware button, or sliding a toggle or switch on the hardware button, etc.), wherein: the restocking suggestion unit is configured to cause the voice output interface to output a respective restocking suggestion with regard to an item stored in the first compartment when the first compartment is opened; and cause the voice output interface to output a respective restocking suggestion with regard to an item stored in the second compartment when the second compartment is opened. For example, when the user opens the refrigerator refrigeration compartment door, the restocking suggestion unit looks up a list of restocking suggestions that are relevant to items stored in the refrigeration compartment, causes the voice output interface to output one or more of the list of restocking suggestions one by one, and causes the first hardware button in the interior of the refrigeration compartment to light up and ready to receive user confirmation with respect to each of the list of restocking suggestions as the restocking suggestion is output by the voice output interface. When the user opens the refrigerator freezer compartment door, the restocking suggestion unit looks up a list of restocking suggestions that are relevant to items stored in the freezer compartment, causes the voice output interface to output one or more of the list of restocking suggestions one by one, and causes the fourth hardware button in the interior of the freezer compartment to light up and ready to receive user confirmation with respect to each of the list of restocking suggestions as the restocking suggestion is output by the voice output interface.

In some embodiments, the voice-assisted restocking system includes: a user presence detection unit (e.g., including a light sensor installed in the interior of the first compartment that is triggered when the door of the first compartment is opened, or a motion sensor installed on the exterior of the first compartment that is triggered when a user moves pass the first compartment), wherein the user presence detection unit is configured to detect the user's presence in the vicinity of the first compartment, wherein the user presence detection unit is configured to trigger the voice output interface to output the first voice-based restocking suggestion that has been received from the remotely located digital assistant sever. In some embodiments, the user presence detection unit is part of a digital assistant client located at the refrigerator, including one or more processors and memory, and instructions that, when executed by the one or more processors, cause the processors to perform the client-side functions of the digital assistant, such as user-facing I/O functions, server-facing I/O functions, controlling and monitoring of the hardware button in the interior of the refrigerator compartment.

Ins some embodiments, the user presence detection unit is configured to detect that a door of the first compartment is opened, and the user presence detection unit is configured to, in accordance with the detection that the door of the first compartment is opened and that the first voice-based restocking suggestion has been output by the voice output interface, cause the first hardware button to prompt the user to provide the confirmation input regarding the first restocking suggestion and to wait for the user's confirmation input. In some embodiments, the user presence detection unit is configured to detect the user's actions in addition to user's presence in the vicinity of the first compartment. For example, by using motion sensors and/or weight sensors in the first compartment, the user presence detection unit is configured to determine whether the user is putting items into the compartment, taking items out of the compartment, or merely looking into the compartment, whenever the door of the first compartment is opened by the user. In some embodiments, the restocking suggestion unit only causes the voice output interface to output restocking suggestions when the user presence detection unit detects that the user is taking items out of the compartment or is just looking into the compartment, and does not cause the voice output interface to output any restocking suggestions when the user's presence detection unit detects that the user is putting items into the compartment. The reason for this design is that when the user is putting items into the compartment (e.g., putting groceries into the refrigerator compartments after a grocery shopping trip in person), the restocking suggestions are likely rendered invalid due to the new items that are being put into the compartment by the user. In some embodiments, the restocking suggestion unit only causes the voice output interface to output restocking suggestions when the user presence detection unit detects that the user is just looking into the compartment, and does not cause the voice output interface to output any restocking suggestions when the user's presence detection unit detects that the user is putting items into the compartment or when the user is taking items out of the compartment. The reason for this design is that when the user is putting items into the compartment (e.g., putting groceries into the refrigerator compartments after a grocery shopping trip in person) or when the user is taking items out of the compartment (e.g., taking items out for cooking, or taking drinks out for a guest), the user is most likely getting ready to do something other than checking inventory status in the compartment and does not want to be held up by the restocking suggestions.

In some embodiments, the first hardware button has a built-in fingerprint sensor, and wherein the voice-assisted restocking system further includes an authentication unit that is configured to: in accordance with a determination that the first restocking suggestion is of a first suggestion type that requires user authentication (e.g., a payment suggestion for a reordering that has not been preapproved by the user), transmit a fingerprint captured by the built-in fingerprint sensor to the digital assistant server for authentication; and in accordance with a determination that the first restocking suggestion is of a second suggestion type that does not require user authentication (e.g., a reordering suggestion that has been preapproved by the user), forgo transmitting the fingerprint captured by the built-in fingerprint sensor to the digital assistant.

Other components and functions of the voice-assisted restocking system are provided throughout the present disclosure. The components and functions may be combined in any manner where appropriate. An embodiment may include more or fewer components than described in the various examples.

Figure 4:
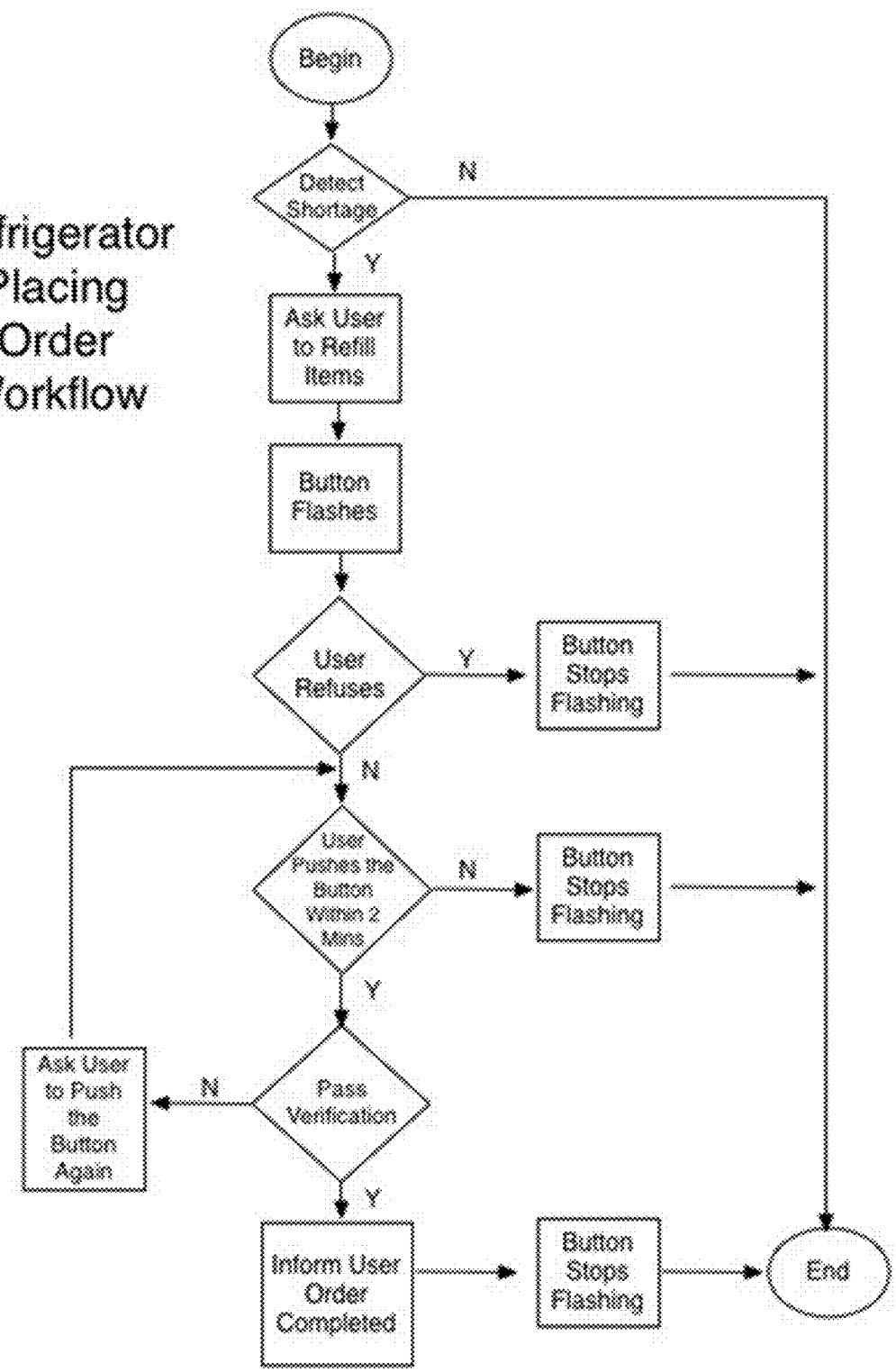
FIG. 4 is a flowchart diagram of a refrigerator order placement workflow of a voice-assisted restocking method, in accordance with some embodiments.

FIG. 4 is a flowchart diagram of a refrigerator order placement workflow of a voice-assisted restocking method, in accordance with some embodiments.

As shown in FIG. 4, the refrigerator continuously monitors inventory status of food items stored in the refrigerator (e.g., quantity, expiration date, usage frequency, usage amount, etc.). In accordance with a determination that at least one item needs to be restocked within a threshold period of time based on the monitoring of the inventor status, the refrigerator outputs a restocking suggestion, e.g., via a voice-based output interface and/or a displayed user interface, regarding the at least one item, asking whether the user wishes to refill the item by placing an online order. While the restocking suggestion is output by the refrigerator, the hardware button on the refrigerator flashes and prompts the user to provide a confirmation input or rejection input. In accordance with a determination that the user rejects the restocking suggestion (e.g., via a voice input, e.g., "No."), the button stops flashing and the restocking suggestion is withheld until a later time. In accordance with a determination that the user does not reject the restocking suggestion verbally or otherwise, the refrigerator determines whether the user activates (e.g., pushes) the button within a threshold amount of time (e.g., 2 minutes). In accordance with a determination that the user does not push the button within the threshold amount of time, the button stops flashing and the restocking suggestion is withheld until a later time. In accordance with a determination that the user pushes the button within the threshold amount of time, the refrigerator checks for the user's fingerprint to verify the user's authority in placing a reorder for the item. In accordance with a determination that the user does not pass the authentication (e.g., the fingerprint is not clear), the refrigerator asks the user to push the button again within 2 minutes. In accordance with a determination that the user passes the authentication, the refrigerator informs the user that the reorder is placed and the button stops flashing.

In some embodiments, the user will receive voice reminder of the food shortage when he/she opens the refrigerator door. Then, the voice-based digital assistant informs the user the price and quantity of a chosen product that needs replenishment. The digital assistant asks the user for a purchase decision, which is completed by pressing the flashing or glittering hardware button in the refrigerator. At the same time, the hardware order confirmation button keeps flashing or glittering to catch user's attention. If the user replies in voice that he/she doesn't want to place the order, the shopping process will end and the hardware button immediately stops flashing or glittering. else, the user can press the button within limited time. The refrigerator will check the user's fingerprint to ensure security. The order will be placed once the user passes security. The hardware button immediately stops flashing or glittering afterwards. The digital assistant will ask the user to press the button again if the user authentication fails to go through.

In some embodiments, the user checks food status by interacting with the digital assistant without opening the refrigerator door. The refrigerator will remind the user, once it detects shortage of one or more food items. Information of the specific product will be offered to the user to help him/her to make a purchase decision. Meanwhile the physical button keeps flashing or glittering to capture user's attention and the display on the refrigerator door shows the detailed information of the product. The shopping will end and the physical button immediately stops flashing or glittering if the user rejects the restocking suggestion in voice. Otherwise, the user can press the flashing or glittering button within 2 minutes to complete the order. The refrigerator checks the user's fingerprint. The order will be placed and the digital assistant will inform the user once the fingerprint passes authentication. The physical button will stop flashing or glittering as well. The digital assistant will ask the user to press the button again if the users fails to verify his/her identity.

In some embodiments, if the user wants to buy products through the refrigerator. The user comes to the order confirmation phase after a few clicks on the touch-screen display on the fridge door. Some tips might pop up on the screen and digital assistant reminds the user to press the flashing or glittering button. The button keeps flashing or glittering and the display displays the detailed information of the product. If the user rejects the order suggestion, the process will end and the physical button immediately stops flashing or glittering. If the user presses the flashing or glittering button within 2 minutes, the refrigerator verifies user identity via fingerprint. The order is placed when the authentication is successful and the digital assistant informs the user of the order completion.

Figure 5:
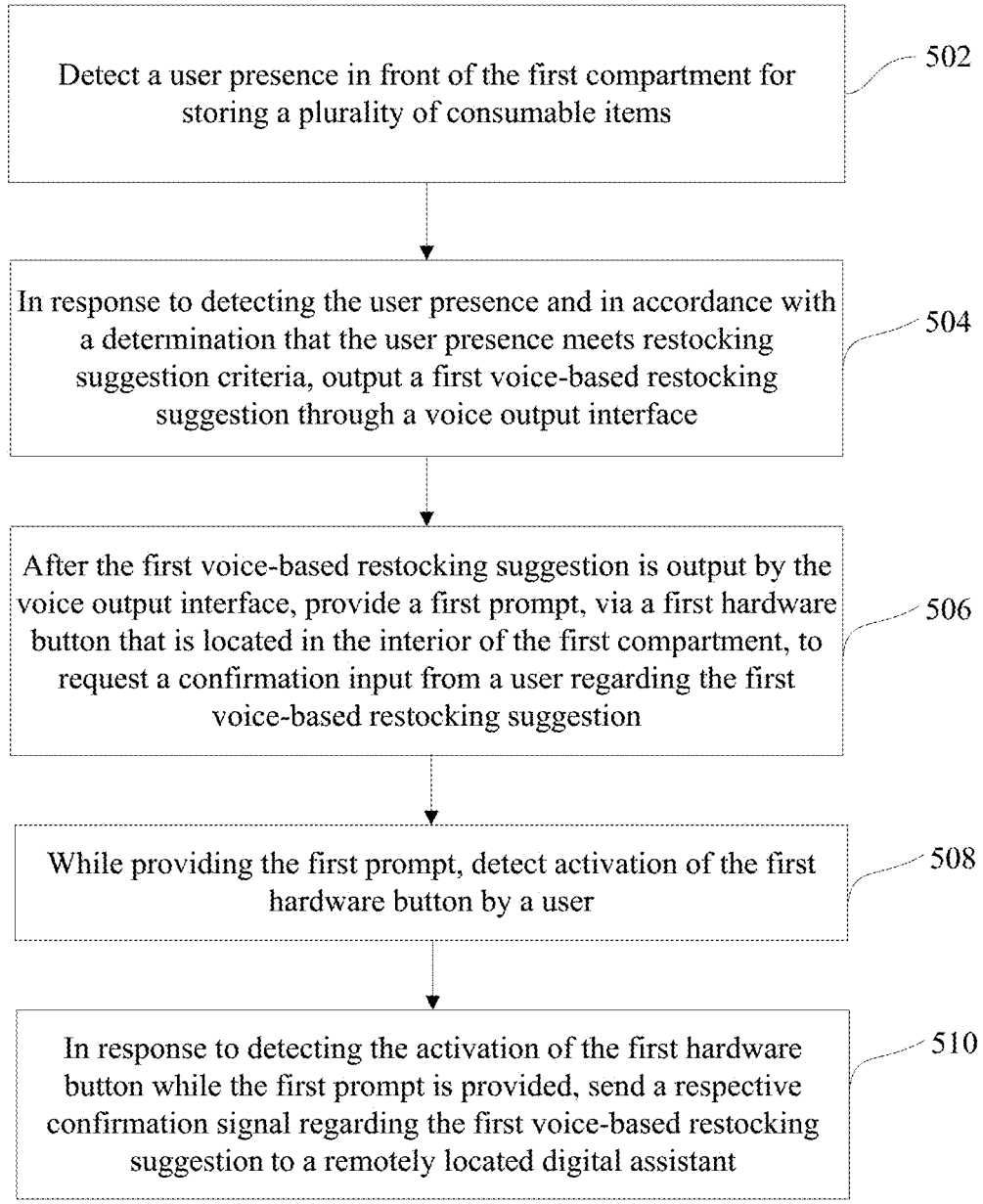
FIG. 5 is a flowchart diagram of a voice-assisted restocking method in accordance with some embodiments.

FIG. 5 is a flowchart diagram of a voice-assisted restocking method 500 in accordance with some embodiments. The method of providing restocking suggestions is performed (e.g., by the voice-assisted reordering system 100) at an appliance (e.g., a smart refrigerator 200) including one or more processors, memory, and a first compartment for storing a plurality of consumable items. The method includes: detecting 502 (e.g., via a user presence detection unit comprising a light sensor or motion sensors) a user presence in front of a first compartment (e.g., a refrigerator compartment) for storing a plurality of consumable items (e.g., an interior of the first compartment is subject to moisture conditions and temperature conditions that are unfavorable to operations of touch-screen displays and non-water-proof electronic components). In some embodiments, the user presence detection unit (e.g., including a light sensor installed in the interior of the first compartment that is triggered when the door of the first compartment is opened, or a motion sensor installed on the exterior of the first compartment that is triggered when a user moves pass the first compartment).

The method further includes: in response to detecting the user presence and in accordance with a determination that the user presence meets restocking suggestion criteria (e.g., the detected user presence includes user opening the door of the first compartment, or the user opening the door of the first compartment without putting any items into the first compartment, and/or the user entered a request for restocking suggestion by providing an input (e.g., a tap input, a press input, etc.) on user interface shown on a touch-screen display attached to the exterior side of the first compartment), outputting 504 a first voice-based restocking suggestion (e.g., "Shall I reorder a dozen eggs?") through a voice output interface (e.g., a speaker located in the interior wall of the refrigerator compartment or, the exterior wall of the refrigerator compartment, or on the edge of a shelf within the refrigerator compartment). In some embodiments, the first voice-based restocking suggestion is provided in accordance with instruction provided by a restocking suggestion unit (e.g., part of a digital assistant client located at the refrigerator, including one or more processors and memory, and instructions that, when executed by the one or more processors, cause the processors to perform the client-side functions of the digital assistant, such as user-facing I/O functions, server-facing I/O functions, controlling and monitoring of the hardware button in the interior of the refrigerator compartment) that is configured to receive voice-based restocking suggestions from a remotely located digital assistant server (and sending voice inputs uttered by a user to the remotely located digital assistant server) over a network communication interface.

The method further includes: after the first voice-based restocking suggestion is output by the voice output interface, providing 506 a first prompt, via a first hardware button (e.g., a water-proof and moisture-proof button (e.g., moisture-proof solid-state button or a moisture-proof mechanical button, that is pressure-sensitive, or mechanically activatable) that is located in the interior of the first compartment (e.g., located in the interior wall of the refrigerator compartment near the refrigerator door, or, on the interior side of the refrigerator door, or on the edge of a shelf near the refrigerator door), to request a confirmation input from a user regarding the first voice-based restocking suggestion (e.g., providing the first prompt by outputting a respective light pattern or audio pattern corresponding to the suggestion type of the first voice-based restocking suggestion); while providing the first prompt, detecting 508 activation of the first hardware button by a user (e.g., by the user pressing on the first hardware button or tapping on the first hardware button, or pulling on the first hardware button, or sliding a toggle or switch on the hardware button, etc.); and in response to detecting the activation of the first hardware button while the first prompt is provided, sending 510 a respective confirmation signal regarding the first voice-based restocking suggestion to a remotely located digital assistant (e.g., through the restocking suggestion unit and the network communication interface). In some embodiments, the first compartment includes a second hardware button (e.g., a water-proof and moisture-proof button (e.g., moisture-proof solid-state button or a moisture-proof mechanical button, that is pressure-sensitive, or mechanically activatable) that is located adjacent to the first hardware button in the interior of the first compartment (e.g., located in the interior wall of the refrigerator compartment near the refrigerator door, or, on the interior side of the refrigerator door, or on the edge of a shelf near the refrigerator door). The method include: providing a second voice-based restocking suggestion via the voice output interface; after the second voice-based restocking suggestion is output by the voice output interface, providing a second prompt, via the second hardware button, to request the user to provide a rejection input (e.g., by outputting a respective light pattern or audio pattern corresponding to the suggestion type of the first voice-based restocking suggestion) regarding the second voice-based restocking suggestion; receiving a user's rejection input (e.g., by activation of the second hardware button), sending a rejection signal to the remotely located digital assistant (e.g., through the restocking suggestion unit and the network communication interface) when the second hardware button is activated by the user (e.g., by the user pressing on the second hardware button or tapping on the second hardware button, or pulling on the second hardware button, or sliding a toggle or switch on the hardware button, etc.). In some embodiments, only a single button is necessary to receive both the confirmation input regarding a respective restocking suggestion and the rejection input regarding the respective restocking suggestion. For example, the light pattern or audio signal is only provided on the first hardware button for a finite period of time, and if the first hardware button is activated by user input within the finite period of time, the input is treated as a confirmation input, and if the first hardware button is not activated by any user input within the finite period of time, the absence of user input is treated as a rejection input and a rejection signal is sent to the remotely located digital assistant after that finite period of time.

In some embodiments, the method includes: while providing the first prompt via the first hardware button, receiving a voice input rejecting the first restocking suggestion through a voice input interface (e.g., a microphone located in the interior wall of the refrigerator compartment or, the exterior wall of the refrigerator compartment, or on the edge of a shelf within the refrigerator compartment); and in response to detecting the user's voice input rejecting the first restocking suggestion, ceasing to providing the first prompt via the first hardware button (e.g., ceasing to provide the light pattern on the first hardware button once the user says "no" to the first restocking suggestion). In some embodiments, the voice-assisted restocking system proceeds to output a second restocking suggestion, and enables the first hardware button to prompt for and accept confirmation input with regard to the second restocking suggestion. In some embodiments, the user's voice input is sent to the digital assistant server to determine the user's intent. In some embodiments, the voice input interface is located on the exterior side of the first compartment. For example, the microphone is located on the front-side of the refrigerator door, along with a touch-sensitive display that is an input/output interface to the remotely located digital assistant. In some embodiments, the voice input interface includes a first microphone located on the exterior side of the refrigerator door, and a second microphone located on the interior side of the refrigerator door. The first microphone on the exterior side of the door is used to capture the user's utterance when the refrigerator door is closed, and the second microphone located on the interior side of the refrigerator door is used to captured the user's utterance when the refrigerator door is closed. In some embodiments, the restocking suggestion unit starts to interact with the user (e.g., alerting the user that certain items in the refrigerator compartment may be approaching expiration date, running out, or depleted, and suggesting a restocking of those items) through the microphone, speaker, and/or touch-screen display that are located on the exterior side of refrigerator door when the refrigerator door is closed, and continues with the interaction (e.g., continues with restocking suggestions, requesting user confirmation of a restocking purchase to be made through the digital assistant server, etc.) using the speaker, microphone, and the hardware button that are located on the interior side of the refrigerator door when the user opens the refrigerator door (e.g., to check on the items currently stored in the refrigerator compartment). In some embodiments, the user provides a rejection input with regard to the first restocking suggestion after the first restocking suggestion has been output by the voice output interface. In response to receiving the user's voice-based rejection input through the voice input interface, the restocking suggestion unit moves on to provide additional restocking suggestions, if available, and sends the received rejection input to the digital assistant server over the network communication interface. In some embodiments, the first hardware button immediately stops prompting the user for confirmation input (e.g., ceasing to provide the light pattern or audio pattern), when the user's voice rejection input has been received.

In some embodiments, the first compartment is an enclosed compartment (e.g., a compartment for storing fruits and vegetables, a compartment for storing meat, and a compartment for storing frozen food, etc.) of a refrigerator; the enclosed compartment of the refrigerator has a door with an interior side facing an interior of the enclosed compartment when the door is in a closed state, and with an exterior side facing the an exterior of the enclosed compartment when the door is in an open state; and the first hardware button is located on the interior side of the door within the interior of the enclosed compartment when the door is in the closed state.

In some embodiments, the method includes: generating (e.g., via a visual feedback component (e.g., a group of LED light bulbs)) a respective light pattern (e.g., a static light pattern, or an animated light pattern) on the first hardware button that corresponds to a selected one of a plurality of confirmation request types in accordance with a suggestion type (e.g., a suggestion type for making purchase of a suggested quantity, a suggestion type for making a payment of a suggested amount, a suggestion type for selecting a suggested product for restocking, a suggestion type for repeating a previous order of a respective product, etc.) of the first voice-based restocking suggestion. For example, in some embodiments, the first hardware button is lit up with a first light pattern and/or output a first audio signal each time the digital assistant outputs a suggestion of a first suggestion type (e.g., "Shall I proceed to reorder a dozen of eggs?" "Please confirm reordering of one gallon of milk.", etc.). The first hardware button is lit up with a second light pattern and/or output a second audio signal that is distinct from the first light pattern/first audio signal each time the digital assistant outputs a suggestion of a second suggestion type (e.g., "Shall I proceed with making a payment of $3.55 for the one dozen eggs?" "Please confirm payment of $4.5 for reordering the one gallon of milk.", etc.).

In some embodiments, the first prompt is provided for no more than a threshold amount of time, and the confirmation signal is sent to the remotely located digital assistant when the first hardware button is activated by the user within the threshold amount of time after the first voice-based restocking suggestion is output by the voice output interface. In some embodiments, the method includes: sending a respective rejection signal to the remotely located digital assistant when the first hardware button is not activated within the threshold amount of time after the first voice-based restocking suggestion is output by the voice output interface. In some embodiments, the voice-assisted restocking system receives and outputs a second voice-based restocking suggestion that is distinct from the first voice-based restocking suggestion if no user confirmation input is received on the first hardware button within the threshold amount of time after the first voice-based restocking suggestion was output by the voice output interface. For example, the digital assistant may generate a series of restocking suggestions (e.g., "Please confirm which of the following items should be reordered: one dozen eggs . . . one gallon of milk . . . one pound of ground chicken . . . one dozen canned soda, . . . "), after name of each of the food items is output by the voice output interface, the first hardware button blinks to prompt the user to press the button to confirm. If the user presses the button within the threshold amount of time (e.g., 5 seconds) after a first food item is announced, the reordering of that first food item is confirmed. Then the name of the next food item is output by the voice output interface and the first hardware button blinks to prompt the user to activate the button to confirm the reordering of the next food item. If the user did not press the button within the threshold amount of time after the first food item is announced, the reordering of that first food item is rejected, and name of the next food item is output by the voice output interface and the first hardware button blinks to prompt the user to activate the button to confirm the reordering of the next food item.

In some embodiments, the method includes: displaying the first restocking suggestion and a confirmation of the first restocking suggestion in accordance with user activation of the first hardware button. For example, a touch-screen display is included on the exterior side of the door of the refrigerator compartment. When the first restocking suggestion is output by the voice output interface of the voice-assisted restocking system, the restocking suggestion unit checks to determine whether the door of the refrigerator compartment is closed or open. In accordance with a determination that the refrigerator door is closed, the touch-screen display displays the first restocking suggestion and optionally additional information related to the first restocking suggestion; and in accordance with a determination that the refrigerator door is open, the touch-screen display forgoes displaying the first restocking suggestion because the user presumably is not going to be able to see the touch-screen display on the outside of the refrigerator door. In some embodiments, in accordance with a determination that the confirmation input regarding the first restocking suggestion has been received while the refrigerator door was open, and in accordance with a determination that the refrigerator door is now closed after the confirmation input regarding the first restocking suggestion has been received, the touch-screen display displays the first restocking suggestion and the confirmation of the first restocking suggestion. So that if the user wishes to make any correction or modifications to the suggested restocking action, the user can perform it on the touch-screen display.

In some embodiments, the method includes: displaying the first restocking suggestion on the touch-screen display in accordance with a determination that the first compartment is in a closed state (e.g., the restocking reminders are displayed on the touch-screen display when the refrigerator door is closed); and generating a light pattern to prompt for the confirmation input regarding the first restocking suggestion in accordance with a determination that the first compartment has switched from the closed state to an open state (e.g., the refrigerator door is opened by the user while the restocking reminders were displayed on the touch-screen display). In some embodiments, the restocking suggestion unit is further configured to cause the touch-screen display to cease to display the first restocking suggestion in accordance with a determination that the first compartment has switched from the open state back to the closed state after the confirmation input has been received on the first hardware button. For example, after the user has confirmed the reordering of a dozen eggs by pressing the first hardware button, when the user closes the door of the refrigerator, the reminder for restocking the dozen eggs is no longer displayed on the touch-screen display.

In some embodiments, the method includes: detecting (e.g., via a user presence detection unit comprising a light sensor or motion sensors) a second user presence in front of a second compartment (e.g., a freezer compartment) that is distinct from the first compartment (e.g., an interior of the second compartment is subject to moisture conditions and temperature conditions that are unfavorable to operations of touch-screen displays and non-water-proof electronic components); in response to detecting the second user presence and in accordance with a determination that the second user presence meets restocking suggestion criteria (e.g., the detected user presence includes user opening the door of the second compartment, or the user opening the door of the second compartment without putting any items into the second compartment, and/or the user entered a request for restocking suggestion by providing an input (e.g., a tap input, a press input, etc.) on user interface shown on a touch-screen display attached to the exterior side of the second compartment), outputting a fourth voice-based restocking suggestion (e.g., "Shall I reorder a dozen eggs?") through the voice output interface; after the fourth voice-based restocking suggestion is output by the voice output interface, providing a fourth prompt, via a fourth hardware button (e.g., a water-proof and moisture-proof button (e.g., moisture-proof solid-state button or a moisture-proof mechanical button, that is pressure-sensitive, or mechanically activatable) that is located in the interior of the second compartment (e.g., located in the interior wall of the freezer compartment near the freezer door, or, on the interior side of the freezer door, or on the edge of a shelf near the freezer door), to request a confirmation input from a user regarding the fourth voice-based restocking suggestion (e.g., providing the fourth prompt by outputting a respective light pattern or audio pattern corresponding to the suggestion type of the fourth voice-based restocking suggestion); while providing the fourth prompt, detecting activation of the fourth hardware button by a user (e.g., by the user pressing on the fourth hardware button or tapping on the fourth hardware button, or pulling on the fourth hardware button, or sliding a toggle or switch on the fourth hardware button, etc.); and in response to detecting the activation of the fourth hardware button while the fourth prompt is provided, sending a respective confirmation signal regarding the fourth voice-based restocking suggestion to the remotely located digital assistant (e.g., through the restocking suggestion unit and the network communication interface), wherein: the first restocking suggestion is output with regard to an item stored in the first compartment when the first compartment is opened; and the fourth restocking suggestion is output with regard to an item stored in the second compartment when the second compartment is opened. For example, when the user opens the refrigerator refrigeration compartment door, the restocking suggestion unit looks up a list of restocking suggestions that are relevant to items stored in the refrigeration compartment, causes the voice output interface to output one or more of the list of restocking suggestions one by one, and causes the first hardware button in the interior of the refrigeration compartment to light up and ready to receive user confirmation with respect to each of the list of restocking suggestions as the restocking suggestion is output by the voice output interface. When the user opens the refrigerator freezer compartment door, the restocking suggestion unit looks up a list of restocking suggestions that are relevant to items stored in the freezer compartment, causes the voice output interface to output one or more of the list of restocking suggestions one by one, and causes the fourth hardware button in the interior of the freezer compartment to light up and ready to receive user confirmation with respect to each of the list of restocking suggestions as the restocking suggestion is output by the voice output interface.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 500 described above.

Figure 6:
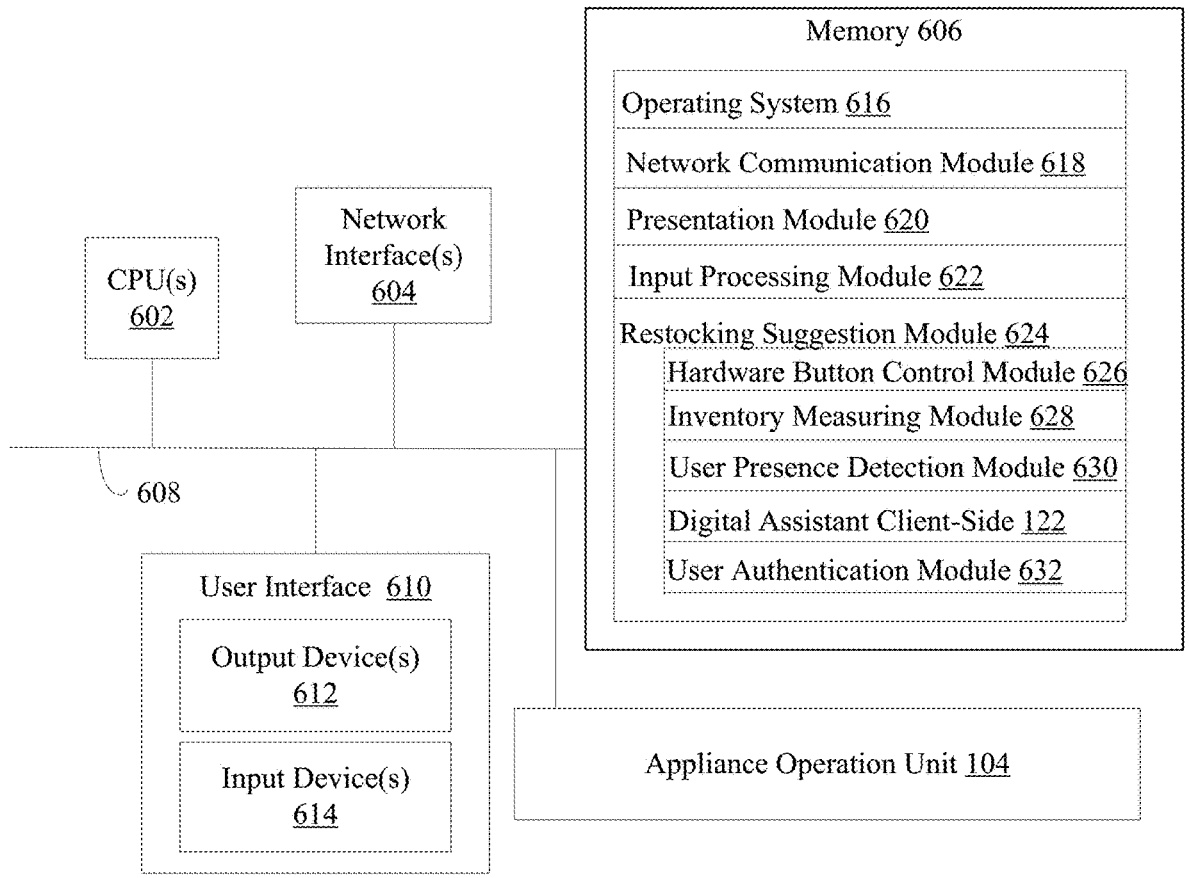
FIG. 6 is a block diagram of a voice-assisted restocking system in accordance with some embodiments.

FIG. 6 is a block diagram illustrating a representative voice-assisted restocking system 100 (e.g., appliance 600 (e.g., smart refrigerator 200)). The voice-assisted restocking system 100 (e.g., appliance 600) includes one or more processing units (CPUs) 602, one or more network interfaces 604, memory 606, and one or more communication buses 608 for interconnecting these components (sometimes called a chipset). The voice-assisted restocking system 100 (e.g., appliance 600) also includes a user interface 610. User interface 610 includes one or more output devices 612 that enable presentation of media content, including one or more speakers and/or one or more visual displays. User interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, the voice-assisted restocking system 100 (e.g., appliance 600) includes one or more hardware buttons for providing prompts and accepting user confirmation inputs with regard to restocking suggestions output by the voice-assisted restocking system 100 (e.g., appliance 600).

In some embodiments, voice-assisted restocking system 100 further includes sensors, which senses operating state of the system 100, presence of user, inventory status, etc. Sensors include but are not limited to one or more microphones, one or more cameras, an ambient light sensor, one or more accelerometers, one or more gyroscopes, a temperature sensor, humidity sensors, one or more motion sensors, one or more biological sensors (e.g., a galvanic skin resistance sensor, a pulse oximeter, and the like), and other sensors.

Furthermore, the system 100 includes appliance operation unit 104 that includes components that perform the primary functions of the system 100 (e.g., appliance 600).

Memory 606 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

operating system 616 including procedures for handling various basic system services and for performing hardware dependent tasks;

network communication module 618 for connecting system 100 to other computing devices (e.g., a server system 128) or mobile control devices (e.g., smart phones or tablets) connected to one or more networks via one or more network interfaces 604 (wired or wireless);

presentation module 620 for enabling presentation of information;

input processing module 622 for detecting one or more user inputs or interactions from one of the one or more input devices 614 and interpreting the detected input or interaction;

Restocking Suggestion Module 624, including but not limited to:

Hardware button control module 626 for controlling the one or more hardware buttons 116;

Inventory measuring module 628 for controlling the inventory measuring unit 118;

User presence detection module 630 for controlling the user presence detection unit 120;

Digital assistant client-side 122; and

User authentication module 632 for controlling the user authentication unit 124; and other modules for performing other functions set forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A voice-assisted restocking system, comprising:
a first compartment for storing a plurality of consumable items;
a restocking suggestion unit that is configured to receive voice-based restocking suggestions from a remotely located digital assistant server over a network communication interface;
a voice output interface configured to output the voice-based restocking suggestions to a user; and
a first hardware button that is located in an interior of the first compartment, wherein the first hardware button is configured to:
after a first voice-based restocking suggestion from the remotely located digital assistant server is output by the voice output interface, prompt the user to provide a confirmation input regarding the first voice-based restocking suggestion;
send a respective confirmation signal to the remotely located digital assistant server when the first hardware button is activated by the user within a threshold amount of time after the first voice-based restocking suggestion is output by the voice output interface; and
send a respective rejection signal to the remotely located digital assistant server when the first hardware button is not activated within the threshold amount of time after the first voice-based restocking suggestion is output by the voice output interface.

2. The voice-assisted restocking system of claim 1, including:
a voice input interface configured to capture voice inputs uttered by the user before the voice inputs are sent by a network communication unit to the remotely located digital assistant server.

3. The voice-assisted restocking system of claim 1, wherein:
the first compartment is an enclosed compartment of a refrigerator;
the enclosed compartment of the refrigerator has a door with an interior side facing an interior of the enclosed compartment when the door is in a closed state, and with an exterior side facing an exterior of the enclosed compartment when the door is in an open state; and
the first hardware button is located on the interior side of the door within the interior of the enclosed compartment when the door is in the closed state.

4. The voice-assisted restocking system of claim 1, wherein the first hardware button includes a visual feedback component that is configured to generate a respective light pattern corresponding to a selected one of a plurality of confirmation request types in accordance with a suggestion type of the first voice-based restocking suggestion.

5. The voice-assisted restocking system of claim 1, including:
a second hardware button that is located adjacent to the first hardware button in the interior of the first compartment, wherein the second hardware button is configured to:
after a second voice-based restocking suggestion from the remotely located digital assistant server is output by the voice output interface, prompt the user to provide a rejection input regarding the second voice-based restocking suggestion; and
send a rejection signal to the remotely located digital assistant server when the second hardware button is activated by the user.

6. The voice-assisted restocking system of claim 1, including:
a touch-screen display that is configured to display the first voice-based restocking suggestion and a confirmation of the first voice-based restocking suggestion in accordance with user activation of the first hardware button.

7. The voice-assisted restocking system of claim 6, wherein the restocking suggestion unit is configured to:
- cause display of the first voice-based restocking suggestion on the touch-screen display in accordance with a determination that the first compartment is in a closed state; and
- cause the first hardware button to generate a light pattern to prompt for the confirmation input regarding the first voice-based restocking suggestion in accordance with a determination that the first compartment has switched from the closed state to an open state.

8. The voice-assisted restocking system of claim 6, including:
- a third hardware button that is located on an exterior of the first compartment, wherein the third hardware button is configured to:
  - after a third voice-based restocking suggestion from the remotely located digital assistant server is output by the voice output interface, prompt the user to provide a confirmation input regarding the third voice-based restocking suggestion; and
  - send a respective confirmation signal to the remotely located digital assistant server when the third hardware button is activated by the user.

9. The voice-assisted restocking system of claim 6, including:
- a second compartment that is distinct from the first compartment;
- a fourth hardware button that is located in the interior of the second compartment, wherein the fourth hardware button is configured to:
  - after a fourth voice-based restocking suggestion from the digital assistant is output by the voice output interface, prompt the user to provide a confirmation input regarding the fourth voice-based restocking suggestion; and
  - send a respective confirmation signal to the remotely located digital assistant server when the fourth hardware button is activated by the user, wherein:
  - the restocking suggestion unit is configured to cause the voice output interface to output a respective restocking suggestion with regard to an item stored in the first compartment in accordance with a determination that the first compartment is opened; and
- cause the voice output interface to output a respective restocking suggestion with regard to an item stored in the second compartment in accordance with a determination that the second compartment is opened.

10. The voice-assisted restocking system of claim 6, including:
- a user presence detection unit, wherein the user presence detection unit is configured to detect a user's presence in a vicinity of the first compartment, wherein the user presence detection unit is configured to trigger the voice output interface to output the first voice-based restocking suggestion that has been received from the remotely located digital assistant sever.

11. The voice-assisted restocking system of claim 10, wherein:
- the user presence detection unit is configured to detect that a door of the first compartment is opened, and
- the user presence detection unit is configured to, in accordance with the detection that the door of the first compartment is opened and that the first voice-based restocking suggestion has been output by the voice output interface, cause the first hardware button to prompt the user to provide the confirmation input regarding the first voice-based restocking suggestion and to wait for the user's confirmation input.

12. The voice-assisted restocking system of claim 6, wherein the first hardware button has a built-in fingerprint sensor, and wherein the voice-assisted restocking system further includes an authentication unit that is configured to:
- in accordance with a determination that the first voice-based restocking suggestion is of a first suggestion type that requires user authentication, transmit a fingerprint captured by the built-in fingerprint sensor to the remotely located digital assistant server for authentication; and
- in accordance with a determination that the first voice-based restocking suggestion is of a second suggestion type that does not require user authentication, forgo transmitting the fingerprint captured by the built-in fingerprint sensor to the remotely located digital assistant server.

13. A method of providing restocking suggestions, comprising:
- at an appliance including one or more processors, memory, and a first compartment for storing a plurality of consumable items:
  - detecting a user presence in front of the first compartment;
  - in response to detecting the user presence and in accordance with a determination that the user presence meets first criteria, outputting a first voice-based restocking suggestion through a voice output interface;
  - after the first voice-based restocking suggestion is output by the voice output interface, providing a first prompt, via a first hardware button that is located in an interior of the first compartment, to request a confirmation input from a user regarding the first voice-based restocking suggestion;
  - while providing the first prompt, detecting activation of the first hardware button by the user; and
  - in response to detecting the activation of the first hardware button while the first prompt is provided, sending a respective confirmation signal regarding the first voice-based restocking suggestion to a remotely located digital assistant.

14. The method of claim 13, including:
- while providing the first prompt via the first hardware button, receiving a voice input rejecting the first voice-based restocking suggestion through a voice input interface; and
- in response to detecting a user's voice input rejecting the first voice-based restocking suggestion, ceasing to providing the first prompt via the first hardware button.

15. The method of claim 13, wherein:
- the first compartment is an enclosed compartment of a refrigerator;
- the enclosed compartment of the refrigerator has a door with an interior side facing an interior of the enclosed compartment when the door is in a closed state, and with an exterior side facing an exterior of the enclosed compartment when the door is in an open state; and
- the first hardware button is located on an interior side of the door within the interior of the enclosed compartment when the door is in the closed state.

16. The method of claim 13, including:
- generating a respective light pattern on the first hardware button that corresponds to a selected one of a plurality of confirmation request types in accordance with a suggestion type of the first voice-based restocking suggestion.

17. The method of claim 13, wherein:
the first prompt is provided for no more than a threshold amount of time, and the respective confirmation signal is sent to the remotely located digital assistant server when the first hardware button is activated by the user within the threshold amount of time after the first voice-based restocking suggestion is output by the voice output interface.

18. The method of claim 13, including:
displaying the first voice-based restocking suggestion and a confirmation of the first voice-based restocking suggestion in accordance with user activation of the first hardware button.

19. The method of claim 18, including:
displaying the first voice-based restocking suggestion on a touch-screen display in accordance with a determination that the first compartment is in a closed state; and
generating a light pattern to prompt for the confirmation input regarding the first voice-based restocking suggestion in accordance with a determination that the first compartment has switched from the closed state to an open state.

* * * * *